(12) United States Patent
Tolmachev

(10) Patent No.: US 10,324,764 B2
(45) Date of Patent: Jun. 18, 2019

(54) METHOD AND SYSTEM FOR PROCESSING TASKS IN A CLOUD SERVICE

(71) Applicant: YANDEX EUROPE AG, Lucerne (CH)

(72) Inventor: Lev Vladimirovich Tolmachev, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 242 days.

(21) Appl. No.: 15/464,402

(22) Filed: Mar. 21, 2017

(65) Prior Publication Data

US 2017/0318099 A1 Nov. 2, 2017

(30) Foreign Application Priority Data

Apr. 29, 2016 (RU) .................. 2016116944

(51) Int. Cl.
- *H04L 29/08* (2006.01)
- *G06F 9/50* (2006.01)
- *H04L 12/58* (2006.01)
- *H04L 12/26* (2006.01)

(52) U.S. Cl.
CPC .......... *G06F 9/505* (2013.01); *H04L 43/0817* (2013.01); *H04L 51/04* (2013.01); *H04L 67/10* (2013.01); *H04L 67/1002* (2013.01); *H04L 67/1008* (2013.01); *H04L 67/34* (2013.01)

(58) Field of Classification Search
CPC . G06F 9/3891; G06F 9/3885; H04L 43/0817; H04L 51/04; H04L 67/1008
See application file for complete search history.

(56) References Cited

U.S. PATENT DOCUMENTS

| 8,839,392 B2* | 9/2014 | Chakra ................... G06F 3/005 |
| | | 726/7 |
| 2006/0271544 A1* | 11/2006 | Devarakonda ........ G06F 9/5027 |
| 2010/0146514 A1 | 6/2010 | Alexander et al. |

(Continued)

FOREIGN PATENT DOCUMENTS

| RU | 141774 U1 | 6/2014 |
| RU | 2579899 C1 | 4/2016 |

OTHER PUBLICATIONS

English Abstract of RU141774 retrieved on Espacenet on Jul. 13, 2017.

*Primary Examiner* — Chirag R Patel
(74) *Attorney, Agent, or Firm* — BCF LLP

(57) ABSTRACT

There are provided a method and a system for processing tasks in a cloud service. The method comprises: receiving, by the first controlling electronic device, a first task; determining whether at least one server within a plurality of servers of the first data center being available for performing the first task; responsive to the at least one server within the plurality of servers of the first data center being available for performing the first task, assigning the first task to said at least one available server; responsive to none server within the plurality of servers of the first data center being available for performing the first task, transmitting said first task to at least one cross-datacenter storing device, the at least one cross-datacenter storing device is configured to transmit the first task to the second controlling electronic device responsive to receiving a request from the second controlling electronic device.

18 Claims, 3 Drawing Sheets

(56) References Cited

U.S. PATENT DOCUMENTS

| | | |
|---|---|---|
| 2011/0078297 A1 | 3/2011 | Tamura |
| 2011/0154341 A1 | 6/2011 | Pueyo et al. |
| 2011/0154350 A1* | 6/2011 | Doyle ................... G06F 9/5044 718/104 |
| 2012/0204176 A1* | 8/2012 | Tian ........................ G06F 9/505 718/1 |
| 2013/0007901 A1 | 1/2013 | Tsao |
| 2014/0101669 A1 | 4/2014 | Lee et al. |
| 2015/0163161 A1* | 6/2015 | Arikatla ................ H04L 47/726 709/226 |
| 2016/0103708 A1 | 4/2016 | Mathew |

* cited by examiner

METHOD AND SYSTEM FOR PROCESSING TASKS IN A CLOUD SERVICE

CROSS-REFERENCE

The present application claims priority to Russian Patent Application No. 2016116944, filed Apr. 29, 2016, entitled "СПОСОБ И СИСТЕМА ОБ РАБОТКИ ЗАДАЧ В ОБЛАЧНОМ СЕРВИСЕ", the entirety of which is incorporated herein by reference.

FIELD OF THE TECHNOLOGY

The present technology relates to a cloud service in general and specifically to a method and a system for processing tasks in the cloud service.

BACKGROUND

A substantial portion of digital calculations and digital content management is performed using cloud platforms. Cloud platforms transmit processed data as a service to one or more clients. A cloud platform can provide users with a cloud service, which allows users to upload, store and provide a shared access to files or other digital content to/by remote servers. Typically, a user may use the cloud service to store files for a multitude of purposes, such as data archival, ease of access to the file irrespective of location, time or electronic device used for accessing the file, sharing of the file with other users, and the like. A variety of files may be stored on the cloud service, including files used for personal or professional use, such as data files, portable document format (pdf) files, word processing files, text files, images, photographs, multimedia content for entertainment purposes, and the like.

For example, a user may operate in various contexts, wherein in each of them the user plays a different role and has different responsibilities. These different roles might relate to the professional or personal life of the user in the role of an employee, a contractor, a customer, a supplier, or a family member, for example. Within these various contexts, a user may use different user electronic devices (e.g., desktop computers, laptop computers, personal computers, mobile phones, tablets, etc.) or use electronic devices that utilize remote processing capability (e.g., applications hosted on a web site or a virtual machine hosted in a data center). Different computing environments may be installed on user electronic devices with local processing capabilities (e.g., different operating systems, virtual software environments, Web applications, native applications, containers, BIOS/APIs, etc.) to interact with the cloud platform.

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access computing services on a cloud platform regardless of hardware/software systems and communications networks that the given user is using. The given user can access the cloud platform via a communication network by two principle means. The given user can access a particular resource directly, either by typing an address of the resource (typically a Universal Resource Locator (URL), such as www.webpage.com) or by clicking a link in an e-mail or in another web resource.

In cloud storage services, various problems may need to be solved by a cloud service provider. Cloud platforms include a plurality of servers combined into data centers. Thus, a task processing speed of the cloud platform directly depends on computational power of cloud platform servers and efficiency of task distribution between the servers.

US20110078297 patent application, published Mar. 31, 2011) teaches a job processing system. The job processing system has first to third servers. The first server has a job generation program for generating jobs as requested. The second server has a storage device for storing attribute information on and a file for use in processing each job generated by the first server, a management table for managing job management information on each job by assigning a unique ID to each job, and a queue control program for registering job management information in the management table, referring to the management table, and registering the file for and attribute information on each job in the storage device. The third server has one or more job processing programs for processing jobs acquired from the second server, batch control program for acquiring jobs from the second server and issuing responses concerning the processed jobs, and a storage device for storing attribute information on and a file for each job acquired.

US patent application 2011/007,8297 discloses a job processing system that has first to third servers. The first server has a job generation program for generating jobs as requested. The second server has a storage device for storing attribute information on and a file for use in processing each job generated by the first server, a management table for managing job management information on each job by assigning a unique ID to each job, and a queue control program for registering job management information in the management table, referring to the management table, and registering the file for and attribute information on each job in the storage device. The third server has one or more job processing programs for processing jobs acquired from the second server, batch control program for acquiring jobs from the second server and issuing responses concerning the processed jobs, and a storage device for storing attribute information on and a file for each job acquired.

US patent application 2010/014,6514 teaches an execution management method which includes providing an execution plan, balancing an execution load across a plurality of servers, automatically interpreting the execution plan, and re-driving a failed test to another of the plurality of servers if the test case fails on an originally selected available server. The execution plan includes a plurality of test cases and criteria corresponding to the test cases. More than one of the plurality of test cases may be run on each of the plurality of servers at a same time in parallel. Each of the plurality of servers is run independently.

SUMMARY

It is an object of the present technology to ameliorate at least some of the inconveniences present in the prior art.

Developers of the present technology have appreciated that there exists at least one problem with existing distributed/cloud processing systems. In the known task planning systems, several criteria for task planning are used: processing speed, reliability, and waiting time of computational resources. Currently there is a number of drawbacks in task planning systems, one of the most noticeable is the fact that these systems have been developed to work in a single data center. In case of an unbalanced load in several distributed data centers and responsive to a need to share tasks between the data centers, the known task planning systems fail to do so. Since a task planning system in a first data center does not "know" a load of a second data center.

In accordance with a first broad aspect of the present technology, there is provided a method of processing a task. The method is executable in a system comprising a first data center, at least one second data center, and at least one cross-datacenter storing device, the first data center including a first controlling electronic device associated with a plurality of servers of the first data center and coupled to at least one cross-datacenter storing device, the second data center including a second controlling electronic device associated with a plurality of servers of the second data center and coupled to at least one cross-datacenter storing device. The method comprises: receiving, by the first controlling electronic device, a first task for processing, determining whether at least one server of the plurality of servers of the first data center is available for performing the first task; responsive to the at least one server of the plurality of servers of the first data center being available for performing the first task, assigning the first task to the at least one server; responsive to none of the plurality of servers of the first data center being available for performing the first task, transmitting the first task to at least one cross-datacenter storing device, the at least one cross-datacenter storing device is configured to transmit the first task to the second controlling electronic device responsive to receiving a request from the second controlling electronic device.

In some implementations of the method, the receiving the first task comprises receiving the first task, by the first controlling electronic device, from at least one server within the plurality of servers of the first data center.

In some implementations of the method, the first task is at least one of: content grouping according to a specific feature, content indexing, restoring of deleted content, renewing links to public content, sending a notification, subscribing to an event using a user ID, obtaining a user list for a shared folder, and deleting content.

In some implementations of the method, transmitting the first task to the at least one cross-datacenter storing device further comprises transmitting, by the first controlling electronic device, at least one of: an indication of a task priority, server configuration data for performing the task, and an indication of a task deadline.

In some implementations of the method, the method further comprises generating, by the second controlling electronic device, the request for a task, the request further including at least one of: an indication of available computing resources of at least one available server of the second data center, and an indication of availability period of the at least one server of the second data center.

In some implementations of the method, the method further comprises generating, by the second controlling electronic device, the request for the task, the generating the request being executed in response to the at least one server within the plurality of servers of the second data center being available for performing a task.

In some implementations of the method, the method further comprises generating, by the second controlling electronic device, the request for the task, the generating the request being executed in response to receiving an indication of availability of at least one server within the plurality of servers of the second data center.

In some implementations of the method, the method further comprises periodically sending, by the second controlling electronic device, a request for a new task to the at least one cross-datacenter storing device.

In some implementations of the method, the method further comprises responsive to the at least one server within the plurality of servers of the second data center processing a third task, a priority of the third task being lower than a priority of the first task, the first task having been stored at the cross-datacenter storing device: sending, by the second controlling electronic device, a request for transmitting the first task; pausing, by the second controlling electronic device of the second data center, processing the third task, the priority of the third task being lower than the priority of the first task, and sending the first task for processing to at the least one server within the plurality of the servers of the second data center.

In some implementations of the method, the method further comprises continuing, by the at least one server within the plurality of servers of the second data center, processing the third task, after finishing processing the first task.

In some implementations of the method, the method further comprises continuing, by a different one of the plurality of servers of the second data center, processing the third task.

In some implementations of the method, the method further comprises: receiving, by the second controlling electronic device, a second task, determining whether at least one server of the plurality of servers of the second data center being is available for performing the second task; responsive to the at least one server within the plurality of servers of the second data center being available for performing the second task, assigning the second task to the at least one server; responsive to none of the plurality of servers of the second data center being available for performing the second task, transmitting the second task to at least one cross-datacenter storing device.

In some implementations of the method, receiving the second task comprises receiving the second task, by the second controlling electronic device, from at least one server of the plurality of servers of the second data center.

In some implementations of the method, the second task is at least one of: content grouping according to a specific feature, content indexing, restoring of deleted content, renewing links to public content, sending a notification, subscribing to an event using a user ID, obtaining a user list for a shared folder, deleting content.

In some implementations of the method, transmitting the second task to the at least one cross-datacenter storing device further comprises transmitting, by the second controlling electronic device, at least one of: an indication of a task priority, server configuration data for performing the task, and an indication of a task deadline.

In some implementations of the method, the method further comprises responsive to the at least one server within the plurality of servers of the first data center being available for performing a task, the method further comprises transmitting, by the first controlling electronic device, a request for a task to at least one cross-datacenter storing device: responsive to receiving the request from the first controlling electronic device, transmitting, by the at least one cross-datacenter storing device, the second task to the first controlling electronic device; receiving, by the first controlling electronic device, the second task, and assigning the second task to at least one server from the plurality of servers of the first data center, the at least one server being available for performing the second task.

In some implementations of the method, the method further comprises generating, by the first controlling electronic device, the request for the task, the request further including at least one of: computing resources of at least one available server, and an indication of an availability period of the at least one server.

In some implementations of the method, the method further comprises periodically sending, by the first controlling electronic device, a request for a new task to at least one cross-datacenter storing device.

In accordance with another broad aspect of the present technology, there is provided a system for task processing, the system comprising a first data center, a second data center, and at least one cross-datacenter storing device, the first data center including a first controlling electronic device associated with a plurality of servers of the first data center and coupled to at least one cross-datacenter storing device, the second data center comprising a second controlling electronic device associated with a plurality of servers of the second data center and coupled to at least one cross-datacenter storing device, the first controlling device being configured to execute: receiving, by the first controlling electronic device, a first task for processing, determining whether at least one server of the plurality of servers of the first data center is available for performing the first task; responsive to the at least one server of the plurality of servers of the first data center being available for performing the first task, assigning the first task to the at least one server; responsive to none of the plurality of servers of the first data center being available for performing the first task, transmitting the first task to at least one cross-datacenter storing device, the at least one cross-datacenter storing device is configured to transmit the first task to the second controlling electronic device responsive to receiving a request from the second controlling electronic device.

In accordance with another broad aspect of the present technology, there is provided a controlling electronic device comprising: at least one communication interface for communication with a plurality of servers of the data center and for communication with at least one cross-datacenter storing device, a data storage storing control instructions, and at least one processor, the control instructions, when executed, being configured to cause: receiving a first task for processing; determining whether at least one server of the plurality of servers of the first data center is available for performing of the first task; responsive to the at least one server within the plurality of servers of the first data center being available for performing the first task, assigning the first task to the at least one available server; responsive to none server of the plurality of servers of the first data center not being available for performing the first task, transmitting the first task to at least one cross-datacenter storing device.

One of the technical effects of the present technology, inter alia, is increasing effectiveness of task distribution between data centers.

In the context of the present specification, unless expressly provided otherwise, the expression "computer-readable medium", "storage", "storage device" is intended to include memory of any nature and kind whatsoever, including RAM, ROM, disks (CD-ROMs, DVDs, floppy disks, hard drivers, etc.), USB keys, solid state-drives, tape drives, etc.

In the context of the present specification, an "indication of" an information element may be the digital object itself or a pointer, reference, link, or other indirect mechanism enabling the recipient of the indication to locate a network, memory, database, or other computer-readable memory location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient of that an indication of the information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the servers, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

The term "server availability" in the context of the present technology means that at the moment the server has available resources for task processing and the server is physically able to perform the given task.

Each implementation of the present technology has at least one of the above-mentioned object and/or aspects, but do not necessarily have all of them. It should be understood that some aspects of the present disclosure that have resulted from attempting to attain the above-mentioned object may not satisfy this object or may satisfy other objects not specifically recited herein.

Additional and/or alternative features, aspects, and advantages of embodiments of the present disclosure will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
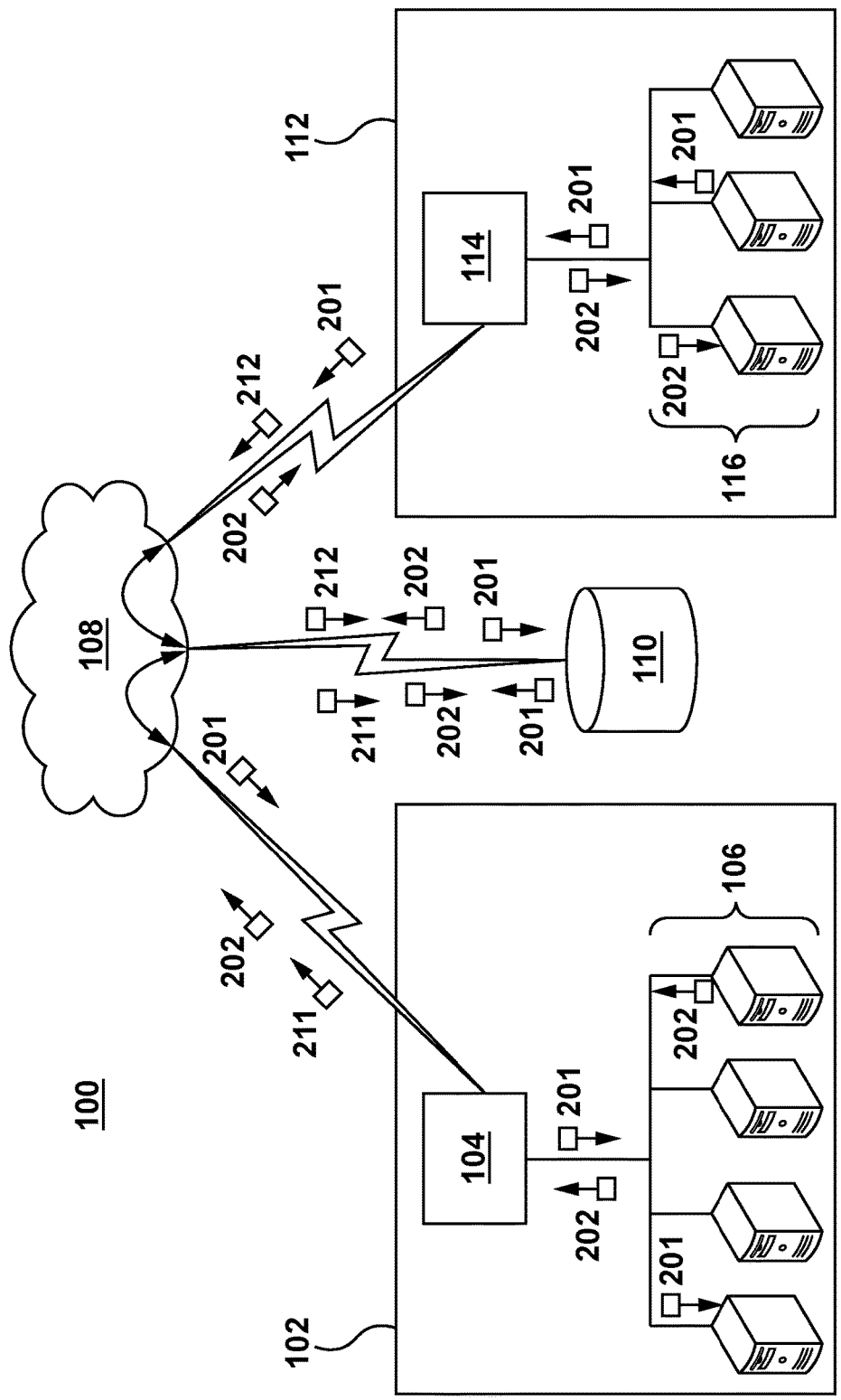
FIG. 1 depicts a schematic diagram of a system implemented in accordance with non-limiting embodiments of the present technology.

In FIG. 1 there is provided a schematic diagram of a system 100 implemented in accordance with non-limiting embodiments of the present technology. It is to be expressly understood that the system 100 is depicted as the illustrative implementations of the present technology. Thus, the description thereof that follows is intended to be only a description of illustrative examples of the present technology. This description is not intended to define the scope or set forth the bounds of the present technology. In some cases, what are believed to be helpful examples of modifications to system 100 may also be described below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that in certain instances the system 100 may provide simple implementation of the present technology, and that where such is the case they have been presented in this manner as an aid to understanding. As persons skilled in the art would understand, various implementations of the present technology may be of a greater complexity.

Although the embodiments of the present technology are described using cloud data storage service, other embodiments are possible, for example, embodiments implemented as a search engine service, a weather forecast service, a social networks, etc. Thus, the present technology is applicable for any cloud—based (or otherwise distributed) services and is not limited to cloud data storage services. The following description and examples are presented for ease of explanation only and, therefore, are non-limitative.

With reference to FIG. 1, the system 100 comprises a first data center 102, a second data center 112, and at least one cross-datacenter storing device 110. The first data center 102 and the second data center 112 are connected with at least one cross-datacenter storing device 110 via a communication network 108. In some non-limited implementations, the communication network 108 can be implemented as the Internet. In other implementations, the communication network 108 can be implemented alternatively as a wide area network or local area network, private network and the like.

In a non-limiting implementation of the system 100 of FIG. 1, the first data center 102 and the second data center 112 are connected with the communication network 108. It should be noted that for the purpose of the present technology it is sufficient to have the first data center 102 and the second data center 112 in communication with the cross-datacenter storing device 110. Thus, in alternative embodiments of the present technology, the first data center 102 and the second data center 112 may be interconnected at least via the cross-datacenter storing device 110.

The first data center 102 comprises a first controlling electronic device 104 associated with a plurality of servers 106 of the first data center 102 and coupled to at least one cross-datacenter storing device 110.

The first controlling electronic device 104 comprises at least one communication interface (not shown) for communications with the plurality of servers 106 of the first data center 102 and for communication with at least one cross-datacenter storing device 110, a data storage (not shown) storing control instructions, and at least one processor (not shown), the control instructions, when executed, are configured to cause various processes described herein.

The first controlling electronic device 104 may be implemented as a conventional computer server, for example, Dell™ PowerEdge™ Server running Microsoft™ Windows Server™ operational system. It should be noted that the first controlling electronic device 104 can be implemented in any other suitable hardware and/or software and/or firmware or a combination thereof.

Various possible implementations of the communication interface are well known in the art. How the first controlling electronic device 104 is connected with the plurality of servers 106 of the first data center 102 and how first controlling electronic device 104 is connected with the cross-datacenter storing device 110 is not particularly limited. As a non-limited example, a connection of the first controlling electronic device 104 to the plurality of servers 106 of the first data center can be performed using wired communications (Ethernet-based connection). Alternatively or additionally, the first controlling electronic device 104 may be connected with at least one server of the plurality of servers 106 via a wireless communication network (such as but not limited to, a 3G communications network, a 4G communications network, a Wireless Fidelity, or WiFi® for short, Bluetooth® and the like). Similarly, the first controlling electronic device 104 can be connected with the cross-datacenter storing device 110 using wired or wireless communications or a combination thereof.

The plurality of servers 106 can be implemented as at least two conventional computer servers. The plurality of servers 106 can comprise similar servers as well as different servers. For example, in a non-limiting embodiment of the present technology, the plurality of servers 106 of the first data center 102 can comprise four similar Dell™ PowerEdge™ servers running Microsoft™ Windows Server™ operational system. The plurality of servers 106 can be implemented in any other suitable hardware and/or software and/or firmware or a combination thereof. In the present non-limiting embodiment of the present technology, the plurality of servers 106 is implemented as similar Dell™ PowerEdge™ servers, in other non-limiting embodiments of the present technology, the plurality of servers 106 can be implemented as at least two different servers. Thus, a kind, configuration and other parameters of each server of the plurality of servers 106 are non-limitative in the context of the present technology.

The plurality of servers 106 are configured to execute, inter alia: generating a task; receiving the task for processing data or an indication of the task from the first controlling electronic device 104; performing the task assigned by the first controlling electronic device 104; sending the results of data processing of the task to the first controlling electronic device 104.

It should be noted that in some non-limiting embodiments of the present technology, the first controlling electronic device 104 can be one of the plurality of servers 106.

A physical location of each server of the plurality of servers 106 and the first controlling electronic device 104 of the first data center 102 is not limited for the purposes of the present technology. For example, in a non-limiting embodiment of the present technology, the plurality of servers 106 of the first data center 102 can be placed remotely from each other, for example, in different cities. Alternatively or additionally, at least two servers of the plurality of servers 106 can be placed in a close proximity, for example, in the same room.

The data storage (not shown) of the first controlling electronic device 104 stores control instructions, the control instructions, when executed by the processor (not shown) of the first controlling electronic device 104, are configured to cause the first controlling electronic device 104 to execute: receiving a task for data processing; determining whether at least one server of the plurality of servers 106 of the first data center 102 is available for performing the task; responsive to at least one server of the plurality of servers 106 of the first data center 102 being available for performing the task, assigning the task to the at least one available server; responsive to none of the plurality of servers 106 of the first data center 102 being available for performing the task, transmitting the task to at least one cross-datacenter storing device 110.

Thus, the first controlling electronic device 104 is configured to distribute task processing between the plurality of servers 106 of the first data center 102. When there is no server of the plurality of servers 106 of the first data center 102 available for performing the task, the first controlling electronic device 104 is configured to store tasks in its data storage (not shown) or transmit and record the task to the cross-datacenter storing device 110. When the task is stored in the storage of the first controlling electronic device 104 an internal task queue is generated, the tasks are gradually distributed and transmitted for processing to the plurality of servers 106 of the first data center 102 when available. When the task is transmitted and recorded by the cross-datacenter storing device 110, an external queue is generated. The tasks from the external queue are gradually retrieved by controlling electronic devices of others data centers and are transmitted to the respective pluralities of servers of other data centers for processing when the servers are available. In some non-limiting embodiments of the present technology, the first controlling electronic device 104, as an example, is further configured to retrieve tasks from the cross-datacenter storing device 110 and transmit them to at least one available server of the plurality of servers 106 for performing.

In some non-limiting embodiments of the present technology, the data storage (not shown) of the first controlling electronic device 104 further comprises control instructions, the control instructions, when executed by the processor (not shown) of the first controlling electronic device 104, are configured to cause the first controlling electronic device 104 to execute: generating and transmitting a request for a task to at least one cross-datacenter storing device 110; receiving the task from at least one cross-datacenter storing device 110; assigning the received task to at least one available server of the first data center 102 for processing.

In some non-limiting embodiments, the data storage (not shown) of the first controlling electronic device 104 is further configured to store at least one of the following: tasks, task queue, non-active tasks.

The term "server availability" in the context of the present description means that at the moment the server has available resources for task processing and the server is physically able to perform the given task.

The second data center 112 is substantially similar to the first data center and comprises a second controlling electronic device 114 associated with a plurality of servers 116 of the second data center 112 and coupled to at least one cross-datacenter storing device 110.

The second controlling electronic device 114 comprises at least one communication interface (not shown) for communication with the plurality of servers 116 of the second data center 112 and for communication with at least one cross-datacenter storing device 110, a data storage (not shown) storing control instructions, and at least one processor (not shown), the control instructions, when executed, are configured to cause various processes described herein.

The second controlling electronic device 114 may be implemented as a conventional computer server, for example, Dell™ PowerEdge™ Server running Microsoft™ Windows Server™ operational system. It should be noted that the second controlling electronic device 114 can be implemented in any other suitable hardware and/or software and/or firmware or a combination thereof. In the present non-limiting example, the second controlling electronic device 114 is implemented in the same way as the first controlling electronic device 104, however it shall be assumed that such implementations are provided here for the ease of illustration. In other in other implementations controlling electronic devices, servers of the plurality of servers 116 can be implemented using different or partially matching software and hardware.

Various implementations of the communication interface are well known in the art. How the second controlling electronic device 114 is connected with the plurality of servers 116 of the second data center 112 and how second controlling electronic device 114 is connected with the cross-datacenter storing device 110 is not particularly limited. As a non-limited example, a connection of the second controlling electronic device 114 to the plurality of servers 116 of the second data center can be performed using wired communications (Ethernet-based connection). Alternatively or additionally, the second controlling electronic device 114 may be connected with at least one server of the plurality of servers 116 via a wireless communication network (such as but not limited to, a 3G communications network, a 4G communications network, a Wireless Fidelity, or WiFi® for short, Bluetooth® and the like). Similarly, the second controlling electronic device 114 can be connected with the cross-datacenter storing device 110 using wired or wireless communications or a combination thereof.

The plurality of servers 116 can be implemented as at least two conventional computer servers. The plurality of servers 116 can comprise similar as well as different servers. For example, in a non-limiting embodiment of the present technology, the plurality of servers 116 of the first data center 102 can comprise three similar Dell™ PowerEdge™ servers running Microsoft™ Windows Server™ operational system. The plurality of servers 116 can be implemented in any other suitable hardware and/or software and/or firmware or a combination thereof. In the present non-limiting embodiment of the present technology, the plurality of servers 116 is implemented as similar Dell™ PowerEdge™ servers, in other non-limiting embodiments of the present technology, the plurality of servers 116 can be implemented as at least two different servers. Thus, a kind, configuration and other parameters of each server of the plurality of servers 116 are non-limitative in the context of the present technology.

The plurality of servers 116 can be configured to execute, inter alia: generating a task; receiving the task for processing data or an indication of the task from the second controlling electronic device 114; performing the task assigned by the second controlling electronic device 114; sending the results of data processing of the task to the second controlling electronic device 114.

It should be noted that in some non-limiting embodiments of the present technology the second controlling electronic device 114 can be one of the plurality of servers 116.

A physical location of each server of the plurality of servers 116 and the second controlling electronic device 114 of the second data center 112 is not particularly limited for the purposes of the present technology. For example, in a non-limiting embodiment of the present technology, the plurality of servers 116 of the second data center 112 can be placed remotely from each other, for example, in different cities. Alternatively or additionally, at least two servers of the plurality of servers 116 can be placed in a close proximity, for example, in the same room.

The data storage (not shown) of the second controlling electronic device 114 comprises control instructions, the control instructions, when executed by the processor (not shown) of the second controlling electronic device 114, are configured to cause the second controlling electronic device 114 to execute: generating and transmitting a request for a task to at least one cross-datacenter storing device 110; receiving the task from at least one cross-datacenter storing device 110; assigning the received task to at least one available server of the second data center 112 for processing.

Thus, the second controlling electronic device 114 is configured to distribute task processing between the plurality of servers 116 of the second data center 112. When there is an available server in the plurality of servers 116 for performing the task, the second controlling electronic device 114 is configured to send a request and extract the task from the cross-datacenter storing device 110.

In some non-limiting embodiments of the present technology, the data storage (not shown) of the second controlling electronic device 114 further comprises control instructions, the control instructions, when executed on the processor (not shown) of the second controlling electronic device 114, are configured to cause the second controlling electronic device 114 to execute: receiving a task for data processing; determining whether at least one server of the plurality of servers 116 of the second data center 112 is available for performing the task; responsive to at least one server of the plurality of servers 116 of the second data center 112 being available for performing the task, assigning the task to the at least one available server; responsive to none server of the plurality of servers 116 of the second data center 112 being available for performing the task, transmitting the task to at least one cross-datacenter storing device 110.

In some non-limiting embodiments, the data storage (not shown) of the second controlling electronic device 114 is further configured to store at least one of the following: tasks, task queue, non-active tasks.

Figure 2:
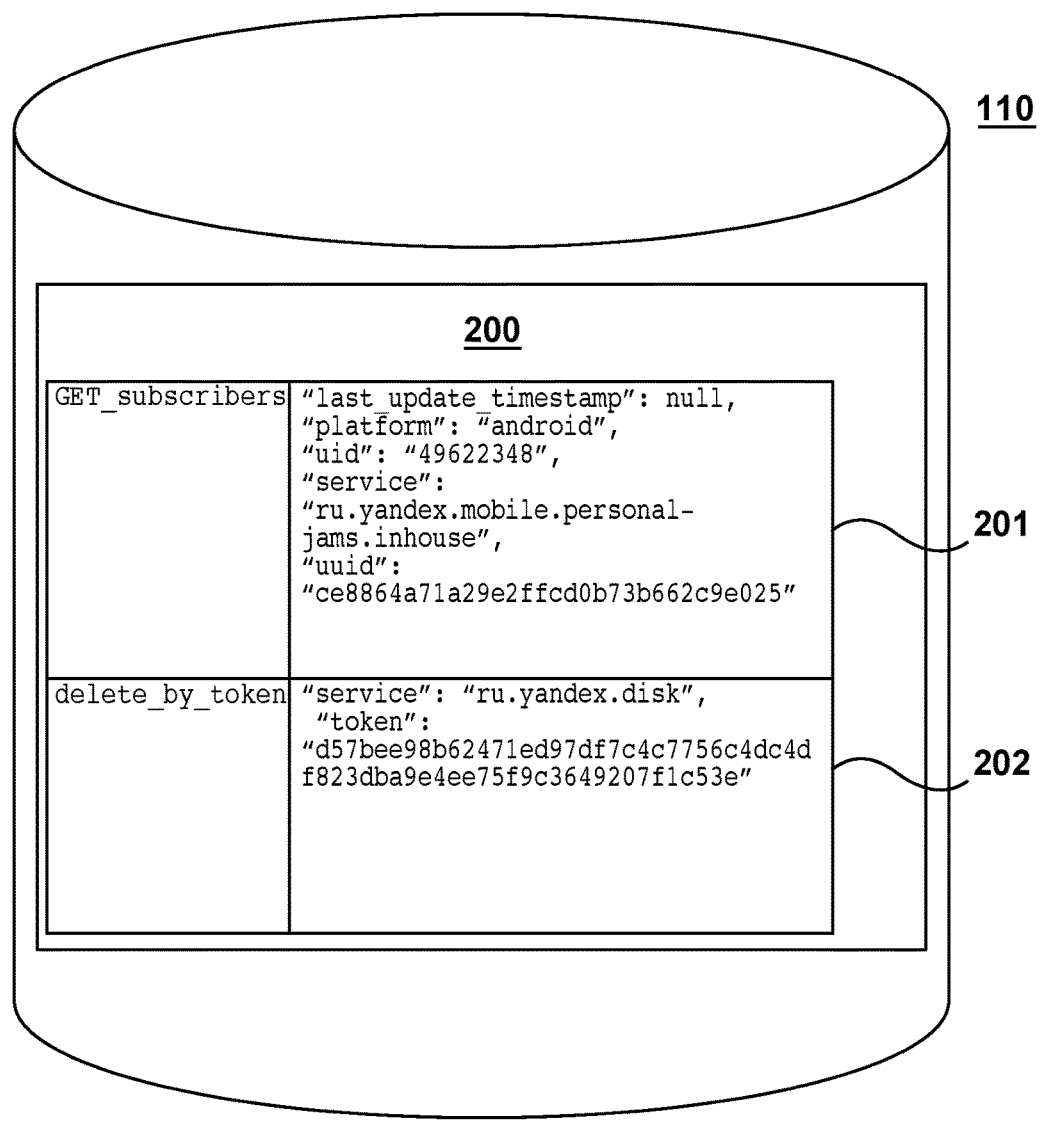
FIG. 2 depicts a schematic diagram of a cross-datacenter storing device of the system of FIG. 1 and implemented in accordance with non-limiting embodiments of the present technology.

With the reference to FIG. 1 and FIG. 2, the cross-datacenter storing device 110 is a computer-readable medium storing at least one task database 200 and configured to connect with controlling electronic devices 104, 114 of data centers 102, 112 via the communication network 108. The cross-datacenter storing device 110 comprises computer-readable instructions configured to: provide access of controlling electronic devices 104, 114 to at least one task database 200; receive tasks 201, 202 from controlling electronic devices 104, 114; store records of tasks 201, 202 received from controlling electronic devices 104, 114; transmit tasks 201, 202 from at least one task database 200 to controlling electronic devices 104, 114 responsive to the request 211, 212; delete tasks 201, 202 from at east one task database 200 after transmitting to controlling electronic devices 104, 114.

The cross-datacenter storing device 110 is connected with at least two data centers 102, 112. A number of data centers connected with the cross-datacenter storing device 110 is not particularly limited. Although in the illustrative example in FIG. 1 there are two data centers 102 and 112, in a real life situation the number of data centers can be dozens, hundreds, thousands etc.

It should be noted that each controlling electronic device 104, 114 of data centers 102, 112 can be connected with at least one cross-datacenter storing device 110. Thus, for example, the first controlling electronic device 104 can be connected with the cross-datacenter storing device 110 as well as with at least one another cross-datacenter storing device (not shown). It should be noted that the at least one another cross-datacenter storing device (not shown) can also be connected with a third controlling electronic device (not shown) of a third data center (not shown). With respect to different cross-datacenter storing device, controlling electronic devices can be configured to: transmit a task only, receive the task only, or transmit and receive the task.

FIG. 2 depicts an example of the task database 200. The task database 200 includes two tasks: a first task 201 received from the first controlling electronic device 104 and a second task 202 received from the second electronic device 114. A number of databases and a number of tasks in each database are not particularly limited and depend on an amount of memory of the cross-datacenter storing device 110.

In the illustrative example in FIG. 2 the first task is a task to receive a list of users for a shared folder in a cloud data storage (GET_subscribers) and can be as follows:

"last_update_timestamp": null,"platform": "android", "uid": "49622348","service": "ru.yandex.mobile.personal-jams.inhouse","uuid":
"ce8864a71a29e2ffcd0b73b662c9e025"

The second task 202 is a task to delete content by token (delete_by_token) in the cloud data storage and can be as follows:

"service":"ru.yandex.disk","token":
"d57bee98b62471ed97df7c4c7756c4dc4df823dba9e4e e75f9c3649207f1c53e"

In some non-limiting embodiments of the method, the first and/or the second task 201, 202 are at least one of: content grouping according to a specific feature, content indexing, restoring of deleted content, renewing links to public content, sending a notification, subscribing to an event using a user ID, obtaining a user list for a shared folder, deleting content.

A form and expression of the first task 201 and the second task 202 are not particularly limited and are presented for ease of explanation only. Further, the specific example of the cloud data storage is non-limitative and other implementations, are of course, possible.

As alternative example, in case of a search engine, tasks in the task database 200 of the cross-datacenter storing device 110 can be, for example, at least one of the following: to renew an index, to recalculate ranking parameters for a web-page, to delete a document from the index.

In case of a weather service, tasks in the task database 200 can be, for example, at least one of: calculating temperature using parameters (a set of current parameters of the weather), updating saved information based on data obtained from weather stations, preliminary calculating data for a machine learned algorithm.

In case of social networks, tasks in the task database 200 can be, for example, at least one of: updating a user profile, sending a notification to a user, adding a new event to a calendar.

Figure 3:
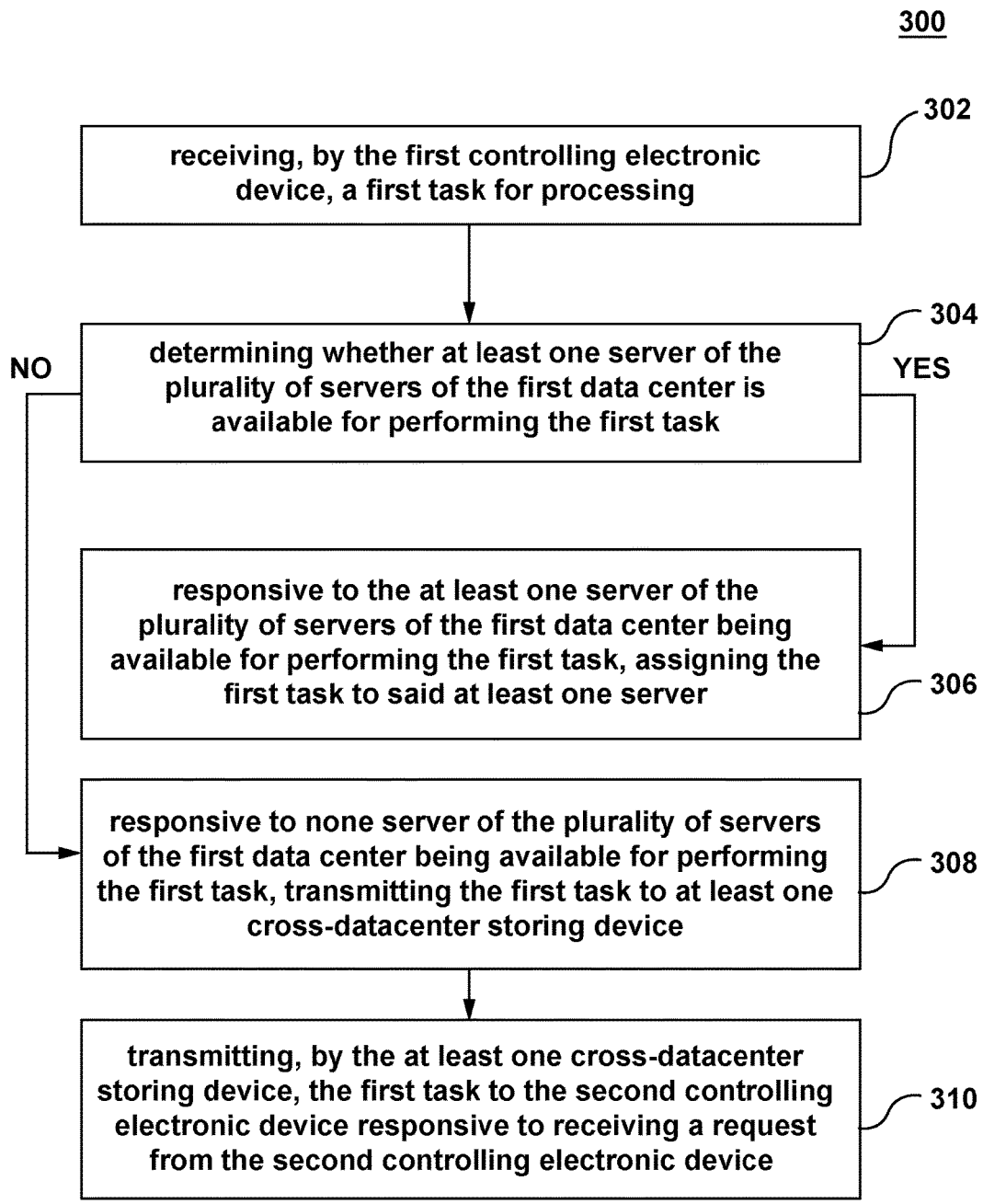
FIG. 3 depicts a block diagram of a method, the method being implemented within the system of FIG. 1 in accordance with non-limiting embodiments of the present technology.

FIG. 3 depicts a block diagram of a flow chart of a method 300, the method 300 being implemented within the system 100 of FIG. 1 and implemented in accordance with non-limiting embodiments of the present technology.

Step 302—receiving, by the first controlling electronic device, a first task for processing The method 300 begins at step 302, where the first controlling electronic device 104 of the first data center 102 receives the first task 201.

In some non-limiting embodiments of the present technology, the first task 201 is received by the first controlling electronic device 104 from at least one server of the plurality of servers 106 of the first data center 102.

In some non-limiting embodiments of the method, the first task 201 is at least one of: content grouping according to a specific feature, content indexing, restoring of deleted content, renewing links to public content, sending a notification, subscribing to an event using a user ID, obtaining a user list for a shared folder, deleting content.

The method proceeds then proceeds to step 304.

Step 304—determining whether at least one server of the plurality of servers of the first data center is available for performing the first task At step 304, the first controlling electronic device 104 determines whether at least one server of the plurality of servers 106 of the first data center 102 is available for performing the first task 201. More specifically, the first controlling electronic device 104 determines if at the moment at least one server has available resources for task processing and is physically able to perform the given task.

Determining can be executed, for example, via polling of the servers of the plurality of servers 106 by the first controlling electronic device 104, or, for example, based on availability data of each server of the plurality of servers, the availability data being stored in a data storage (not shown) of the first controlling electronic device 104. Other ways for determining at least one available server of the plurality of servers 106 may be envisioned.

In some non-limiting embodiments of the method, at step 304 at least one of the following is additionally taken into consideration: a task priority, server configuration data for performing the task, a task deadline.

Then, the method proceeds to step 306 or step 308, depending on the result of determining whether at least one server of the plurality of servers 106 of the first data center 102 being available for performing the first task 201.

Step 306—responsive to the at least one server of the plurality of servers of the first data center being available for performing the first task, assigning the first task to the at least one available server;

If at least one server of the plurality of servers 106 of the first data center 102 is available for performing the first task 201, the first controlling electronic device 104 assigns the first task 201, by the first controlling electronic device 104, to the at least one available server.

Step 308—responsive to none server of the plurality of servers of the first data center being available for performing the first task, transmitting the first task to at least one cross-datacenter storing device, If no server of the plurality of servers 106 of the second data center 103 is available for performing the first task 201, the first controlling electronic device 104 transmits the first task 201 to at least one cross-datacenter storing device 110. The first task 201 is stored in the task database 200 (FIG. 2) of the cross-datacenter storing device 110.

In some non-limiting embodiments of the present technology, transmitting the first task 201 to the at least one cross-datacenter storing device 110 further includes transmitting, by the first controlling electronic device 104, at least one of: a task priority, server configuration data for performing the task, a task deadline. The additional characteristics of the first task 201 are also saved in the task database 200.

The method proceeds then to step 310.

Step 310—transmitting the first task to the second controlling electronic device responsive to receiving a request from the second controlling electronic device At step 310 the second electronic device 114 of the second data center 112 transmits a request 211 for a task to the cross-datacenter storing device 110.

In some non-limiting embodiments of the present technology, the second controlling electronic device 114 generates the request 211 for a task responsive to the at least one server of the plurality of servers 116 of the second data center 112 being available for performing a task.

In some non-limiting embodiments of the present technology, the second controlling electronic device 114 generates the request 211 for a task, the request further includes at least one of: computing resources of at least one available server of the plurality of servers 116, availability period of the at least one server of the plurality of servers 116.

In some non-limiting embodiments of the present technology, the second controlling electronic device 114 generates the request 211 for a task responsive to receiving an indication of availability of at least one server of the plurality of servers 116 of the second data center 112.

Responsive to receiving the request 211 the first task 201 is transmitted to the second controlling electronic device 114 of the second data center 112. The second controlling electronic device 114 assigns the first task 201 to at least one available server of the plurality of servers 116.

The first task 201 is performed on at least one server of the plurality of servers 116, the server being assigned by the second controlling electronic device 114.

After executing step 310 the method terminates.

In some non-limiting embodiments of the present technology, the second controlling electronic device 114 sends requests 211 for tasks to at least one cross-datacenter storing device 110 periodically. The second controlling electronic device 114 can periodically scan at least one cross-datacenter storing device 110 for tasks being stored in the task database 200 irrespective whether there is at least one available server of the plurality of servers 116.

In some non-limiting embodiments of the present technology, responsive to the at least one server of the plurality of servers 116 of the second data center 112 processing a third task (not shown), a priority of the third task (not shown) being lower than a priority of the first task 201, the first task 201 being stored in the task database 200 at the cross-datacenter storing device 110, the second controlling electronic device 114 sends a request for transmitting the first task 201, the second controlling electronic device 114 of the second data center 112 pauses processing the third task (not shown), the priority of the third task (not shown) being lower than the priority of the first task 201, and sends the first task for processing to at least one available server of the plurality of the servers 116 of the second data center 112.

In some non-limiting embodiments of the present technology, the same at least one server of the plurality of servers 116 of the second data center 112 continues processing the third task (not shown), after finishing processing the first task 201.

In some non-limiting embodiments of the present technology, at least one different available server of the plurality of servers 116 of the second data center 112 continues processing the third task (not shown).

Thus, the second controlling electronic device 114 is configured to pause task processing on at least one server the plurality of servers 116, to delay processing on the same at least one server of the plurality of servers 116 or re-assign the paused task to a different server of the plurality of servers 116.

In some non-limiting embodiments of the present technology, after transmitting the first task 201 to the second controlling electronic device 114, the task 201 is deleted from the task database 200 of the cross-datacenter storing device 110. Alternatively, the first task 201 is deleted from the task database 200 after receiving a confirmation of finishing processing of the task 201 from the second controlling electronic device 114.

In embodiments of the present technology, controlling electronic devices of data centers connected to at least one cross-datacenter storing device 110 can act as the first controlling electronic device 104, as the second controlling electronic device 114 or as a combination thereof. In other words, the first controlling electronic device 104 can be configured to send tasks to the cross-datacenter storing device 110 as well as to receive tasks from the cross-datacenter storing device 110. Similarly, the second controlling electronic device 114 can be configured to receive tasks from the cross-datacenter storing device 110 as well as to send tasks to the cross-datacenter storing device 110.

In some non-limiting embodiments of the present technology, the technology further includes: receiving, by the second controlling electronic device 114, a second task 202; determining whether at least one server of the plurality of servers 116 of the second data center 112 is available for performing the second task 202; responsive to the at least one server of the plurality of servers 116 of the second data center being available for performing the second task 202, assigning the second task to the at least one available server of the plurality of servers 116; responsive to none server of the plurality of servers 116 of the second data center 112 being available for performing the second task, transmitting the second task 202 to at least one cross-datacenter storing device 110.

In some non-limiting embodiments of the present technology, the second task 202 is received by the second controlling electronic device 114 from at least one server of the plurality 116 of servers of the second data center 112.

In some non-limiting embodiments of the present technology, the second task 202 is at least one of: content grouping according to a specific feature, content indexing, restoring of deleted content, renewing links to public content, sending a notification, subscribing to an event using a user ID, obtaining a user list for a shared folder, deleting content.

In some non-limiting embodiments of the present technology, transmitting the second task 202 to the at least one cross-datacenter storing device 110 further includes transmitting, by the second controlling electronic device 114, at least one of: an indication of a task priority, an indication of server configuration data for performing the task, an indication of a task deadline.

In some non-limiting embodiments of the present technology, responsive to the at least one server of the plurality of servers 106 of the first data center 102 being available for performing the task, the first controlling electronic device 104 transmits a request 212 for a task to at least one cross-datacenter storing device 110; responsive to receiving the request 212 from the first controlling electronic device 104 the at least one cross-datacenter storing device 110 transmits the second task 202 to the first controlling electronic device 104, the first controlling electronic device 104 receives the second task 202, assigns the second task 202 to at least one server of the plurality of servers 106 of the first data center 102, the at least one server being available for performing the second task 202.

In some non-limiting embodiments of the present technology, the first controlling electronic device 104 generates the request for a task, the request further includes at least one of: computing resources of at least one available server of the plurality of servers 106, and an indication of an availability period of the at least one server of the plurality of servers 106.

In some non-limiting embodiments of the present technology, the first controlling electronic device 104 sends requests for tasks to at least one cross-datacenter storing device 110 periodically.

In some non-limiting embodiments of the present technology, responsive to the at least one server of the plurality of servers 106 of the first data center 102 processing a fourth task (not shown), a priority of the fourth task (not shown) being lower than a priority of the second task 202, the first task 202 being stored at the cross-datacenter storing device 110, the first controlling electronic device 104 sends a request for transmitting the second task 202, the first controlling electronic device 104 of the first data center 102 pauses processing the fourth task (not shown), the priority of the fourth task (not shown) being lower than the priority of the second task (not shown), and sends the second task for processing to at least one available server of the plurality of the servers 106 of the first data center 102.

In some non-limiting embodiments of the present technology, the same at least one server of the plurality of servers 106 of the first data center 102 continues processing the fourth task (not shown), after finishing the second task 202.

In some non-limiting embodiments of the present technology, at least one different available server of the plurality of servers 106 of the first data 102 center continues processing the fourth task (not shown).

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Signal sending-receiving steps, including task and request sending-receiving, are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described embodiments of the present technology may become apparent to those skilled in the art. The foregoing description is intended to be exemplary rather than limiting. Thus, the scope of present technology is limited by the scope of the appended claims only.

The invention claimed is:

1. A method of processing a task, the method executable in a system including:
a first data center,
at least one second data center, and
a cross-datacenter storing device, the cross-datacenter storing device being remote from and communicatively coupled to the first data center and the at least one second data center;
the first data center including a first controlling electronic device associated with a plurality of servers of the first data center and coupled to the cross-datacenter storing device, the second data center including a second controlling electronic device associated with a plurality of servers of the second data center and coupled to the cross-datacenter storing device,
the method comprising:
receiving, by the first controlling electronic device, a first task for processing, determining whether at least one server of the plurality of servers of the first data center is available for performing the first task;
responsive to the at least one server of the plurality of servers of the first data center being available for performing the first task, assigning the first task to said at least one server as part of an internal task queue;
responsive to none of the plurality of servers of the first data center being available for performing the first task, transmitting the first task to the cross-datacenter storing device, thereby generating an external task queue,
the external task queue for receiving overflow tasks from both the first datacenter and the second datacenter;
the cross-datacenter storing device being configured to:
receive a request from the second controlling electronic device, the request being indicative of at least one of the plurality of servers of the second datacenter being available;
responsive to receiving the request, transmit the first task to the second controlling electronic device for execution by the at least one of the plurality of servers of the second datacenter.

2. The method of claim 1, wherein the receiving the first task comprises receiving the first task, by the first controlling electronic device, from at least one server within the plurality of servers of the first data center.

3. The method of claim 1, wherein the first task is at least one of: content grouping according to a specific feature, content indexing, restoring of deleted content, renewing links to public content, sending a notification, subscribing to an event using a user ID, obtaining a user list for a shared folder, and deleting content.

4. The method of claim 1, wherein transmitting said first task to the cross-datacenter storing device further comprises transmitting, by the first controlling electronic device, at least one of: an indication of a task priority, server configuration data for performing the task, and an indication of a task deadline.

5. The method of claim 1, wherein the method further comprises generating, by the second controlling electronic device, the request for a task, the request further including at least one of: an indication of available computing resources of at least one available server of the second data center, and an indication of availability period of the at least one server of the second data center.

6. The method of claim 1, wherein the method further comprises periodically sending, by the second controlling electronic device, a request for a new task to the cross-datacenter storing device.

7. The method of claim 6, wherein the method further comprises responsive to the at least one server within the plurality of servers of the second data center processing a third task, a priority of said third task being lower than a priority of the first task, the first task having been stored at the cross-datacenter storing device:
sending, by the second controlling electronic device, a request for transmitting the first task;
pausing, by the second controlling electronic device of the second data center, processing the third task, the priority of said third task being lower than the priority of the first task, and
sending the first task for processing to at the least one server within the plurality of the servers of the second data center.

8. The method of claim 7, wherein the method further comprises continuing, by the at least one server within the plurality of servers of the second data center, processing the third task, after finishing processing the first task.

9. The method of claim 7, wherein the method further comprises continuing, by a different one of the plurality of servers of the second data center, processing the third task.

10. The method of claim 1, wherein the method further comprises:
receiving, by the second controlling electronic device, a second task,
determining whether at least one server of the plurality of servers of the second data center being is available for performing the second task;
responsive to the at least one server within the plurality of servers of the second data center being available for performing the second task, assigning the second task to said at least one server as part of an internal task queue;
responsive to none of the plurality of servers of the second data center being available for performing the second task, transmitting said second task to the cross-datacenter storing device as part of the external task queue;
the external task queue for receiving overflow tasks from both the first datacenter and the second datacenter.

11. The method of claim 10, wherein receiving the second task comprises receiving the second task, by the second controlling electronic device, from at least one server of the plurality of servers of the second data center.

12. The method of claim 10, wherein the second task is at least one of: content grouping according to a specific feature, content indexing, restoring of deleted content, renewing links to public content, sending a notification, subscribing to an event using a user ID, obtaining a user list for a shared folder, deleting content.

13. The method of claim 10, wherein transmitting said second task to the cross-datacenter storing device as part of the external task queue further comprises transmitting, by the second controlling electronic device, at least one of: an indication of a task priority, server configuration data for performing the task, and an indication of a task deadline.

14. The method of claim 10, wherein the method further comprises responsive to the at least one server within the plurality of servers of the first data center being available for performing a task, the method further comprises transmitting, by the first controlling electronic device, a request for a task to the cross-datacenter storing device:
responsive to receiving the request from the first controlling electronic device, transmitting, by the cross-datacenter storing device, the second task to the first controlling electronic device;
receiving, by the first controlling electronic device, the second task, and assigning the second task to at least one server from the plurality of servers of the first data center, the at least one server being available for performing the second task.

15. The method of claim 14, wherein the method further comprises generating, by the first controlling electronic device, the request for the task, the request further including at least one of: computing resources of at least one available server, and an indication of an availability period of the at least one server.

16. The method of claim 10, wherein the method further comprises periodically sending, by the first controlling electronic device, a request for a new task to cross-datacenter storing device.

17. A system for task processing, the system comprising
a first data center,
a second data center, and
a cross-datacenter storing device, the cross-datacenter storing device being remote from and communicatively coupled to the first data center and the second data center;
the first data center including a first controlling electronic device associated with a plurality of servers of the first data center and coupled to the cross-datacenter storing device,
the second data center comprising a second controlling electronic device associated with a plurality of servers of the second data center and coupled to the cross-datacenter storing device,
the first controlling device being configured to execute:
receiving, by the first controlling electronic device, a first task for processing,
determining whether at least one server of the plurality of servers of the first data center is available for performing the first task;
responsive to the at least one server of the plurality of servers of the first data center being available for performing the first task, assigning the first task to said at least one server as part of an internal task queue;
responsive to none of the plurality of servers of the first data center being available for performing the first task, transmitting said first task to at least one cross-datacenter storing device, thereby generating an external task queue,
the external task queue for receiving overflow tasks from both the first datacenter and the second datacenter;
the cross-datacenter storing device being configured to:
receive a request from the second controlling electronic device, the request being indicative of at least one of the plurality of servers of the second datacenter being available;
responsive to receiving the request, transmit the first task to the second controlling electronic device for execution by the at least one of the plurality of servers of the second datacenter.

18. A controlling electronic device comprising:
at least one communication interface for communication with a plurality of servers of the data center and for communication with a cross-datacenter storing device,
the cross-datacenter storing device being remote from the controlling electronic device;
a data storage storing control instructions, and
at least one processor,
the control instructions, when executed, being configured to cause:
receiving a first task for processing;
determining whether at least one server of the plurality of servers of the first data center is available for performing of the first task;
responsive to the at least one server within the plurality of servers of the first data center being available for performing the first task, assigning the first task to said at least one available server as part of an internal task queue;
responsive to one server of the plurality of servers of the first data center not being available for performing the first task, transmitting said first task to at least one cross-datacenter storing device, thereby generating an external task queue,
the external task queue for receiving overflow tasks from both the first datacenter and the second datacenter
the cross-datacenter storing device being configured to:
receive a request from the second controlling electronic device, the request being indicative of at least one of the plurality of servers of the second datacenter being available;
responsive to receiving the request, transmit the first task to the second controlling electronic device for execution by the at least one of the plurality of servers of the second datacenter.

* * * * *